UNITED STATES PATENT OFFICE.

CHARLES CARROLL GILMAN, OF ELDORA, IOWA.

ART OF MAKING POROUS EARTHENWARE.

SPECIFICATION forming part of Letters Patent No. 353,631, dated November 30, 1886.

Application filed April 24, 1886. Serial No. 200,091. (Specimens.)

*To all whom it may concern:*

Be it known that I, CHARLES CARROLL GILMAN, a citizen of the United States, residing at Eldora, in the county of Hardin and State of Iowa, have invented a new and useful Improvement in the Art of Making Porous Earthenware from Mixtures of Earthy and Vegetable Matters, of which the following is a specification.

The object of my invention is to overcome the difficulties heretofore experienced in making porous earthenware material in large pieces. I accomplish this object by adding to a plastic mixture composed of dampened clay and sawdust, in proportions of one part of the former to one or more of the latter, by measure, a small but sufficient quantity of straw or its equivalent cut in short pieces, as hereinafter described and claimed.

The porous earthenware to which I refer is made porous by the addition to the clay of vegetable matters, subsequently burned out in the kiln. Clay and sawdust mixtures shrink in drying from a plastic state three-fourths of an inch at least per lineal foot. Large pieces weighing one hundred and fifty pounds or more in the green state, owing to the weight imposed upon the boards or frames upon which they are placed to dry, shrink apart instead of together. This trouble I remedy by the addition to the mixture of a slight proportion of fibrous vegetable matter, preferably cut in short lengths, which, under the mixing processes, become distributed through the mass, and, straightening out in the passage of the mixture through a press of expression, are subjected to extreme tension in the mixture after it leaves the die in a pressed form and bind or tie the green material together, so that it cannot crack and spread in drying, but is compelled to shrink within itself.

The process of manufacture is as follows: I take any of the many kinds of surface clays that are free from pebbles and comparatively free from grit, preferring those which have first been "weathered." These clays are pulverized finely by any of the well-known methods of rolling, disintegrating, &c., and spread evenly in given quantities upon a floor to the depth of about three or four inches. Upon this layer of clay I spread a like or greater layer of screened sawdust, and upon the sawdust a sprinkling of straw or hay or like vegetable fibrous material cut in lengths of about two inches. The sawdust and straw layers, if dry, are then sprinkled liberally with water. Another layer of pulverized clay is then added of the same quantity and in the same manner as before, upon which another layer of sawdust and straw, as before described, is placed. This alternation of layers is repeated until a pile three or four feet high has been reached. The whole is now covered over with old bagging or similar material kept moistened with water to prevent evaporation, and allowed to remain a couple of days or more, when it may be sent to the press, the workmen in breaking down the pile with their shovels taking care to stir it well, that the ingredients may become well incorporated.

There are many ways of mixing which will insure a necessary homogeneity of parts; but the above is preferred on account of its simplicity and cheapness.

In this manufacture pressing by "expression" is employed, and any press of expression may be used; but I prefer what is known as the "auger movement," and particularly a press made at Morenci, Michigan, the invention of James F. Clark.

The thorough incorporation of a mass composed of materials so unlike as clay, sawdust, and straw is very peculiar, and is attributed to its horizontal motion while under heavy vertical pressure. Particularly is this the case with the straw-cuttings or fibrous matters, which, without regard to the manner in which they may go into the machine, arrange themselves in their passage through it in a position parallel with each other and with the axis of delivery. These desirable results are not to be obtained by compression.

From the press described the plastic material issues through the die in such a solid column that it has to be cut into sections with a saw instead of a wire, as ordinarily practiced. If the column be broken open and its interior examined, the clay and sawdust will be found to be very evenly mixed and the straw-cuttings distributed at large throughout and almost without exception strained to their utmost tension. This is what prevents the pressed product from cracking in drying.

Clay and granular vegetable mixtures, shrinking in drying, as heretofore referred to, suffer a loss from cracking, and comparatively short and small pieces only may be expected to survive the instant application of artificial heat of 160° intensity or more, to which green blocks fresh from the press are often subjected. The addition of the straw, even in small quantities, furnishes a fiber for the green product, which ties it together, so to speak, and compels it when shrinking to crawl within itself. The empty cells, even after combustion, by reason of their longitudinal shape, afford a grain to the burned product, which materially adds to its strength. This enables the making of large blocks for outside walls, which has never yet been successfully accomplished with porous earthen material without straw mixed in this manner. Blocks so large as to weigh, say, one hundred and fifty pounds to the lineal foot will dry and burn without cracking—a result never before attained with surface-clay mixtures. When perfectly dry, the blocks of the material described, having been placed in a common updraft kiln, will, after ignition, be sufficiently burned by means of the consumption of the imprisoned carbonaceous material; particularly so if the sawdust be of resinous woods—as pine, spruce, &c.—and if the firing be skillfully performed every piece will be burned alike and will be merchantable. The reason of this is, that the clay described comes to a body at 950° Fahrenheit of heat, and this the combustible matter in the material furnishes in its burning. When once fairly on fire, the open drafts of the kiln are closed, sufficient air only being supplied through flues or otherwise to keep the contents in an incandescent state until the vegetable matters are entirely consumed. The burned blocks may be sawed, planed, and tongued and grooved with wood-working tools. Nails may be driven into the burned material, and its weight will be less than half that of building-brick per cubic foot. These processes will not properly work kaolin or fictile clays, as found in fire-clay districts; hence the advantage in the clay and processes herein described, as the other clays require heavy and costly machinery for grinding and mixing, without which the necessary homogeneity of mixture cannot be had, and also expensive downdraft kilns for firing, it requiring a dollar's worth of fuel per ton, aside from that in the mixture. Fictile or kaolin clays require 1000° more heat to bake than the surface clays do, and their existence is common to only few sections of the country.

As will be evident from the foregoing, I am aware that it is common to make tiles and other similar articles by expressing the plastic material from presses, and I do not therefore wish to be understood as claiming this feature, broadly.

I am also aware that it is not new to mix organic or vegetable substances with clay for the purpose of making tiles and bricks porous when they have been burned, and that chopped straw and sawdust, among other substances, have been proposed for this purpose; but, so far as I am aware, plastic clay mixed with chopped straw and sawdust has never heretofore been expressed from presses for the purpose of producing tiles which should be desirably porous and yet have a lengthwise grain, due to the longitudinal arrangement of the short pieces of straw resulting from the expression of the mixture from the presses.

I am also aware of the patents of J. Wadleigh, No. 291,114, January 1, 1884, which refers to building-blocks "composed chiefly of straw," and S. E. Loring, No. 156,361, October 27, 1874, and N. J. Wyeth, No. 3,517, March 28, 1844, which refers to porous earthenware produced by mixing comminuted or pulverized material with the clay; and I am aware of English Patent No. 11,282 of 1846, which refers to the manufacture of porous earthenware, and which mentions "chopped straw" in connection with sawdust, spent tanner's bark, charcoal, &c., "broken or cut up into very small pieces" and mingled with clay to render the article porous, and passed through a press of expression.

What I claim is—

1. That improvement in the art of making porous earthenware which consists in mixing clay, sawdust, and straw cut in lengths, substantially as described, in expressing the mixture through a press, and in burning the same in a kiln, substantially as described.

2. That improvement in the art of making porous earthenware which consists in expressing a mixture of clay, sawdust, and straw cut in lengths, substantially as described, through a press, in contradistinction to compressing the same, whereby the pieces of straw are caused to arrange themselves parallel with each other and with the axis of the press, substantially as described.

3. A porous earthenware product in large blocks made by mixing clay, sawdust, and straw cut in lengths, substantially as described, and subsequently expressing and burning the mixture, as hereinbefore described, substantially as described.

In testimony whereof I have hereunto subscribed my name.

CHARLES CARROLL GILMAN.

Witnesses:
AMBROSE RISDON,
THOMAS RIDER.